US011782581B2

(12) United States Patent
Shen et al.

(10) Patent No.: US 11,782,581 B2
(45) Date of Patent: Oct. 10, 2023

(54) DISPLAY CONTROL METHOD AND DEVICE, ELECTRONIC DEVICE AND STORAGE MEDIUM

(71) Applicant: NETEASE (HANGZHOU) NETWORK CO., LTD., Zhejiang (CN)

(72) Inventors: Ziqi Shen, Zhejiang (CN); Xiao Li, Zhejiang (CN); Guilin Niu, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 127 days.

(21) Appl. No.: 17/613,536

(22) PCT Filed: May 24, 2020

(86) PCT No.: PCT/CN2020/091965
§ 371 (c)(1),
(2) Date: Nov. 23, 2021

(87) PCT Pub. No.: WO2020/238815
PCT Pub. Date: Dec. 3, 2020

(65) Prior Publication Data
US 2022/0261126 A1    Aug. 18, 2022

(30) Foreign Application Priority Data

May 24, 2019    (CN) .......................... 201910438090.5

(51) Int. Cl.
*G06F 3/0483*    (2013.01)
*G06F 3/0488*    (2022.01)

(52) U.S. Cl.
CPC .......... *G06F 3/0483* (2013.01); *G06F 3/0488* (2013.01)

(58) Field of Classification Search
None
See application file for complete search history.

(56) References Cited

U.S. PATENT DOCUMENTS

2006/0123353 A1\* 6/2006 Matthews ............. G06F 3/0481
715/779
2013/0067355 A1\* 3/2013 Hewitt .................... H04L 51/56
715/752

(Continued)

FOREIGN PATENT DOCUMENTS

| CN | 106293752 A | 1/2017 |
| CN | 106528085 A | 3/2017 |

(Continued)

OTHER PUBLICATIONS

"Make Good Use of the Smart Sidebar Function of Oppo Phones", Feb. 28, 2019, Computer enthusiast.

(Continued)

*Primary Examiner* — Haimei Jiang
(74) *Attorney, Agent, or Firm* — Qinghong Xu

(57) ABSTRACT

Provided are a display control method and device, an electronic apparatus, and a storage medium. The display control method includes: in response to an instruction of receiving a target conversation message, displaying a message notification bar in a designated area of the graphical user interface; in response to a first touch operation on the message notification bar, switching and displaying display content from the initial content page to the target conversation page, and generating a floating window control in the graphical user interface; in response to a second touch operation on the floating window control, switching and displaying the display content from the target conversation page to the initial content page.

20 Claims, 8 Drawing Sheets

(56) References Cited

U.S. PATENT DOCUMENTS

| | | | | |
|---|---|---|---|---|
| 2014/0250390 A1* | 9/2014 | Holmes | ............... | G06F 3/0482 |
| | | | | 715/760 |
| 2015/0109230 A1* | 4/2015 | Long | ............... | G06F 3/04883 |
| | | | | 345/173 |
| 2016/0162159 A1* | 6/2016 | Lian | ............... | G06F 9/44505 |
| | | | | 715/771 |

FOREIGN PATENT DOCUMENTS

| | | |
|---|---|---|
| CN | 107544809 A | 1/2018 |
| CN | 107566615 A | 1/2018 |
| CN | 107656672 A | 2/2018 |
| CN | 109213402 A | 1/2019 |
| CN | 110162371 A | 8/2019 |

OTHER PUBLICATIONS

The International Search Report dated Aug. 24, 2020 for PCT international application No. PCT/CN2020/091965.
The 1st Office Action dated Jun. 30, 2020 for CN patent application No. 2019104380905.
The 2nd Office Action dated Sep. 23, 2020 for CN patent application No. 2019104380905.

* cited by examiner

DISPLAY CONTROL METHOD AND DEVICE, ELECTRONIC DEVICE AND STORAGE MEDIUM

CROSS-REFERENCE TO RELATED APPLICATION

The present application is the 371 application of PCT Application No PCT/CN2020/091965, filed on May 24, 2020, which is based on and claims priority to Chinese Patent Application No. 201910438090.5, titled "DISPLAY CONTROL METHOD AND DEVICE, ELECTRONIC DEVICE AND STORAGE MEDIUM", filed on May 24, 2019, the disclosure of which is incorporated herein by reference in its entirety.

TECHNICAL FIELD

The present disclosure relates to the field of display control technology, and in particular, to a display control method, a display control device, an electronic apparatus, and a storage medium.

BACKGROUND

With a rapid development of mobile communication technology, more and more users utilize mobile terminal devices for instant messaging (IM), and thus a large number of IM applications come into being.

In addition to providing the function of instant messaging between different users, most IM applications also provide a large number of resources such as articles and web pages for users to view. If the user receives a conversation message from another user while browsing the resource details such as articles or browsing a user conversation, the user needs to reply to the conversation message. At this time, the user will exit the resource page/the currently viewed user conversation page, which interrupts the current browsing process.

It should be noted that the information disclosed in the background section above is only used to enhance the understanding of the background of the present disclosure, and may include information that does not constitute the related art known to those ordinary skilled in the art.

SUMMARY

According to an aspect of the present disclosure, there is provided a display control method, including: in response to an instruction of receiving a target conversation message, displaying a message notification bar corresponding to the target conversation message in a first designated area of a graphical user interface; in response to a first touch operation on the message notification bar, switching and displaying the display content in the page display area from the initial content page to a target conversation page, and generating a floating window control in the graphical user interface, the target conversation page is a conversation page corresponding to the target conversation message; in response to a second touch operation on the floating window control, switching and displaying the display content in the page display area from the target conversation page to the initial content page.

The present disclosure further discloses a display control device, including: a notification bar display module, configured to, in response to an instruction of receiving a target conversation message, display a message notification bar corresponding to the target conversation message in a first designated area of a graphical user interface; a first page switching module, configured to: in response to a first touch operation on the message notification bar, switch and display the display content in a page display area from an initial content page to a target conversation page; and generate a floating window control in the graphical user interface, where the target conversation page is a conversation page corresponding to the target conversation message; a second page switching module, configured to: in response to a second touch operation on the floating window control, switch and display the display content in the page display area from the target conversation page to the initial content page.

The present disclosure further discloses an electronic apparatus, including: one or more processors; and one or more machine-readable media on which instructions are stored, the instructions, when executed by the one or more processors, cause the electronic apparatus to perform the following steps: in response to an instruction of receiving a target conversation message, displaying a message notification bar corresponding to the target conversation message in a first designated area of a graphical user interface; in response to a first touch operation on the message notification bar, switching and displaying the display content in the page display area from the initial content page to a target conversation page, and generating a floating window control in the graphical user interface, where the target conversation page is a conversation page corresponding to the target conversation message; in response to a second touch operation on the floating window control, switching and displaying the display content in the page display area from the target conversation page to the initial content page.

The present disclosure further discloses one or more machine-readable media on which instructions are stored, the instructions, when executed by one or processors, cause the one or processors to perform the following steps: in response to an instruction of receiving a target conversation message, displaying a message notification bar corresponding to the target conversation message in a first designated area of a graphical user interface; in response to a first touch operation on the message notification bar, switching and displaying the display content in the page display area from the initial content page to a target conversation page, and generating a floating window control in the graphical user interface, where the target conversation page is a conversation page corresponding to the target conversation message; in response to a second touch operation on the floating window control, switching and displaying the display content in the page display area from the target conversation page to the initial content page.

It should be understood that the above general description and detailed description described hereinafter are only exemplary and explanatory, and not intended to limit the present disclosure.

BRIEF DESCRIPTION OF THE DRAWINGS

The drawings herein, which are incorporated into the specification and constitute a part of the specification, show embodiments in accordance with the present disclosure, and explain the principle of the present disclosure in conjunction with the specification. It is apparent that the drawings in the following description are only some embodiments of the present disclosure, for those ordinary skilled in the art, other drawings can be obtained based on these drawings without creative work. In the drawings.

DETAILED DESCRIPTION

In order to make the above objects, features, and advantages of the present disclosure more apparent and understandable, the present disclosure will be further described in detail below with reference to the accompanying drawings and specific embodiments.

In related skills, more and more IM applications can not only provide users with instant messaging functions, but also incorporate resource content such as articles. If the user receives a conversation message while browsing a resource page such as an article, the user needs to find and load the resource page again after processing the conversation message, which makes the user's message processing interaction path complicated. A "floating window" function is newly added in some applications. A floating window control corresponding to the resource page is generated through the "floating window" function to quickly enter the resource page via the floating window control. However, the "floating window" function requires the user to perform a series of operations in advance to generate a floating window control.

Figure 1:
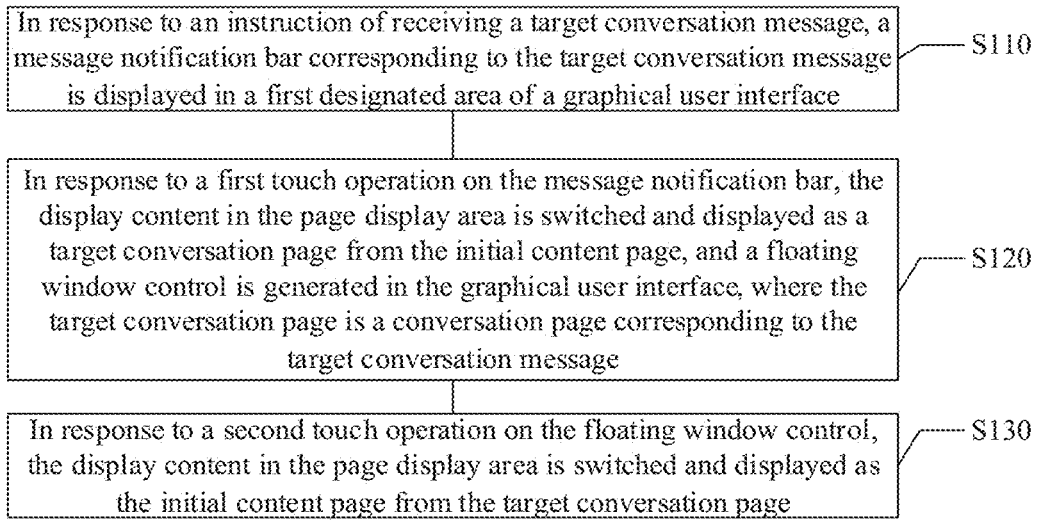
FIG. 1 is a schematic flowchart illustrating a display control method according to an exemplary embodiment of the present disclosure.

In view of the above, in exemplary embodiments, a display control method used in a mobile terminal is first provided. A touch terminal device can be used to implement the method described in the present disclosure. The terminal device can be various electronic apparatuses such as a mobile phone, a tablet computer, and a personal digital assistant (PDA). Referring to FIG. 1, the display control method may include steps described below.

In step 110, in response to an instruction of receiving a target conversation message, a message notification bar corresponding to the target conversation message is displayed in a first designated area of a graphical user interface.

Figure 3:
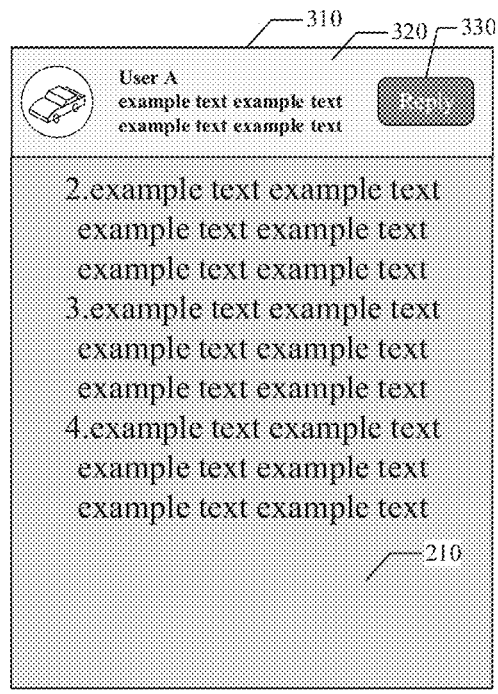
FIG. 3 is a schematic page diagram illustrating a message notification bar displayed in a first designated area of a graphical user interface according to an exemplary embodiment of the present disclosure.

In some exemplary embodiments of the present disclosure, a graphical user interface is displayed on the screen of the mobile terminal. The graphical user interface may include a page display area, and the graphical user interface may be a user interface presented to the user by the terminal device for interaction and page browsing. The first designated area may be a display area designated in advance on the graphical user interface. For example, a part of the topmost area of the graphical user interface may be designated as the first designated area. As shown in FIG. 3, the page display area may be an area for presenting the page being browsed by the user.

The target conversation message may be an instant conversation message sent to a target user from another user when the target user performs remote communication with another user through the terminal device. The message notification bar may be a page object used to notify the target user that a new instant conversation message from another user is received, and the content displayed in the message notification bar corresponds to the target conversation message.

Further, removing the message notification bar may refer to delete the page object of the message notification bar from the current page, so that the message notification bar is no longer displayed. Once a specified operation of the target user on the message notification bar is detected, the message notification bar is removed from the current page. The specified operation on the message notification bar may be a swipe operation on the message notification bar. In addition, a maximum display duration of the message notification bar can be configured. For example, the maximum display duration of the message notification bar can be configured as 3 seconds, 5 seconds, 8 seconds, and so on. When the display duration of the message notification bar exceeds the maximum display duration, the message notification bar can be removed from the current page so that the user can continue to browse the current page.

It is easy for those ordinary skilled in the art to understand that the maximum display duration of the message notification bar can be configured according to the user's requirements in other exemplary embodiments of the present disclosure, so as to achieve the effect of facilitating the user's interactive operations. This is not particularly limited in the exemplary embodiments.

Figure 2:
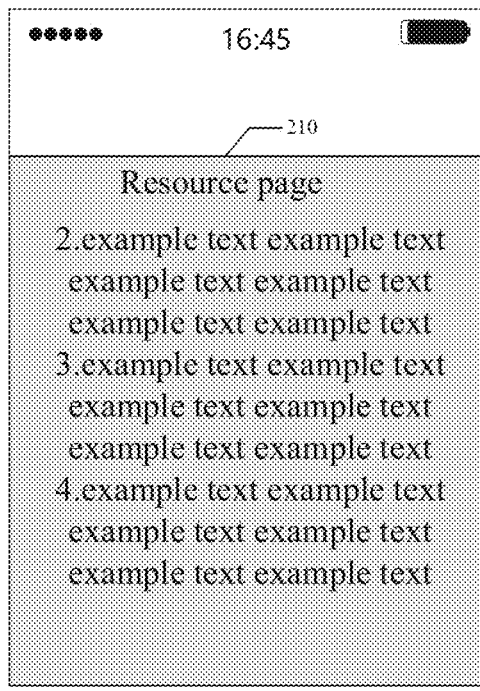
FIG. 2 is a schematic page diagram illustrating an initial content page viewed by a user according to an exemplary embodiment of the present disclosure.

Upon receiving the target conversation message, the terminal device generates an instruction of receiving the target conversation message. In response to the instruction of receiving the target conversation message, the terminal device displays the message notification bar in the first designated area of the graphical user interface. Referring to FIG. 2 and FIG. 3, when the user views page content through the graphical user interface, the page of the page content is an initial content page 210, and the area for displaying the initial content page 210 is the page display area. If an instant conversation message sent from another user (such as user A) is received, the terminal device will display a message notification bar 320 in a first designated area 310 of the graphical user interface, so that the target user can view notification of the latest instant conversation message through the message notification bar 320 and determine whether to perform further process.

In step S120, in response to a first touch operation on the message notification bar, the display content in the page display area is switched and displayed from the initial content page to a target conversation page, and a floating window control is generated in the graphical user interface, where the target conversation page is a conversation page corresponding to the target conversation message.

In some exemplary embodiments of the present disclosure, the first touch operation may be a touch operation on a designated part of the message notification bar, and the touch operation may include, but is not limited to, a long press operation, a repress operation, a click operation, and the like. Referring to FIG. 3, the message notification bar may include a first operation control 330. The first operation control 330 may be a control used by the target user for making a quick reply. The designated part of the notification bar may be a part other than the first operation control 330 in the message notification bar 320.

The initial content page may be a corresponding page displayed on the graphical user interface when the user receives the target conversation message. The initial content page may include, but is not limited to, a conversation page for interacting with other users, and a resource page provided to the user to view. For example, the resource page can be a page displaying other user's interaction dynamics, an article page, an official account details page, etc. The target conversation page may be a conversation page corresponding to the target conversation message, and is an interactive page used by the user to process the conversation message. When the target user performs the first touch operation on the message notification bar, the target conversation page corresponding to the message notification bar is determined, so that after the target conversation page is determined, the initial content page is switched to the target conversation page.

The floating window control can be a page object provided to the target user to open the initial content page. The target user can quickly open the initial content page through the floating window control, and can continue to browse the initial content page from the position being browsed when the page was closed last time.

It should be noted that the initial content page and the target conversation page are different pages that belong to the same application, that is, the present disclosure is applicable to the case of switching between different pages in the same application.

In response to the target user's first touch operation on the message notification bar 320, the terminal device may switch the initial content page 210 in FIG. 3 to the target conversation page 410 and display the target conversation page 410, and generate a floating window control 420 at the top of the target conversation page so that the target user can open the initial content page 210 through the floating window control 420 again.

According to some exemplary embodiments of the present disclosure, before the floating window control is generated in the graphical user interface, page information of the initial content page is determined, and the page information is associated with the floating window control. The page information includes: a page address of the initial content page, a page identifier of the initial content page, and a page location of the initial content page when the initial content page is closed.

The page information of the initial content page may be information that records the currently browsed page, which may include, but is not limited to, the page address of the initial content page, the page identifier of the initial content page, and the page position when the initial content page is closed. The page address of the initial content page can be web page address used by the target user to find the resource page. The page identifier of the initial content page can be an identifier indicating the initial content page, for example, the identifier can be an icon. The page position when the initial content page is closed may be the page position of the initial content page when the initial content page is closed as being switched to another page.

Through determining and recording the page information of the initial content page, the target user can open the initial content page again through the floating window control. Moreover, when the target user opens the initial content page again, he/she can continue to browse the page directly from the position being browsed when the initial content page was closed, without manually finding the position being browsed when the initial content page was closed last time, thereby improving the user's browsing efficiency and enhancing the user's experience.

In step S130, in response to a second touch operation on the floating window control, the display content in the page display area is switched and displayed from the target conversation page to the initial content page.

Figure 4:
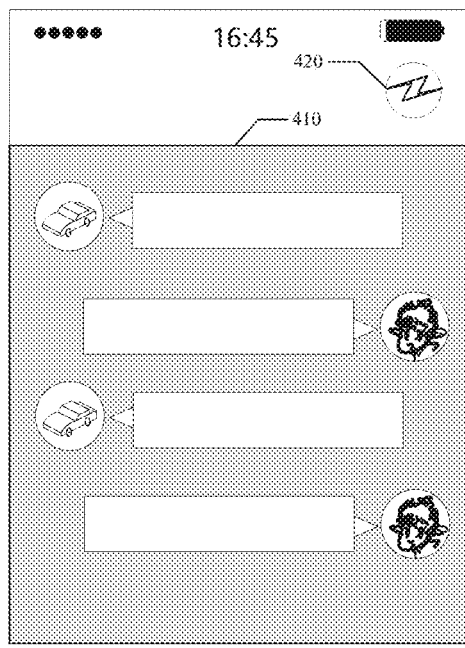
FIG. 4 is a schematic page diagram in which an initial content page is switched and displayed as a target conversation page and a floating window control is generated according to an exemplary embodiment of the present disclosure.

In some exemplary embodiments of the present disclosure, the second touch operation may be a touch operation performed by the target user on the floating window control, and the second touch operation may include, but is not limited to, a click operation, a re-press operation, a long-press operation and the like. Referring to FIG. 2 and FIG. 4, when the target user performs the second touch operation on the floating window control, in response to the second touch operation, the content in the page display area in the graphical user interface of the terminal device will switch from the target conversation page 410 to the initial content page 210 and display the initial content page 210. Moreover, the display content of the initial content page 210 starts from the page position browsed by the target user when the page was closed last time, so that the user continues to browse the initial content page from the last browsing position.

In some exemplary embodiments of the present disclosure, in response to the user performing a second touch operation on the floating window control, while the display content in the page display area is switched and displayed from the target conversation page to the initial content page, the floating window control 420 may be automatically removed from the graphical user interface of the terminal device without manually removing the floating window control by the user, which reduces the user's operating steps and improves the user's operating efficiency.

In another exemplary embodiment of the present disclosure, in response to the user performing a second touch operation on the floating window control, while the display content in the page display area is switched and displayed from the target conversation page to the initial content page, the floating window control 420 can be remained in the graphical user interface. The page information corresponding to the floating window control can be configured as the page information of the target conversation page, so that the target user can directly switch from the initial content page to the target conversation page through the floating window control, which reduces user's operation steps.

It should be noted that, as for the settings regarding whether the floating window control is automatically removed from the page or the floating window control still retains in the page after the page is switched in response to the second touch operation on the floating window control, the user can set in the system configuration of the application. The present disclosure does not make any special restrictions on the settings.

According to some exemplary embodiments of the present disclosure, the message notification bar may include the first operation control. In response to a third touch operation on the first operation control, the message notification bar is hidden, and a quick reply box with a preset size is generated in a second designation of the graphical user interface, so as to reply to the target conversation message based on the quick reply box. Referring to FIG. 3, the first operation control 330 may be an operation control included in the message notification bar. The third touch operation may be a touch operation performed by the target user on the first operation control 330, and the third touch operation may include, but is not limited to, a click operation, a long press operation, a repress operation, and the like. The quick reply box may be a dialog box provided to the target user for a quick reply operation to the target conversation message without leaving the initial content page 210.

Figure 5:
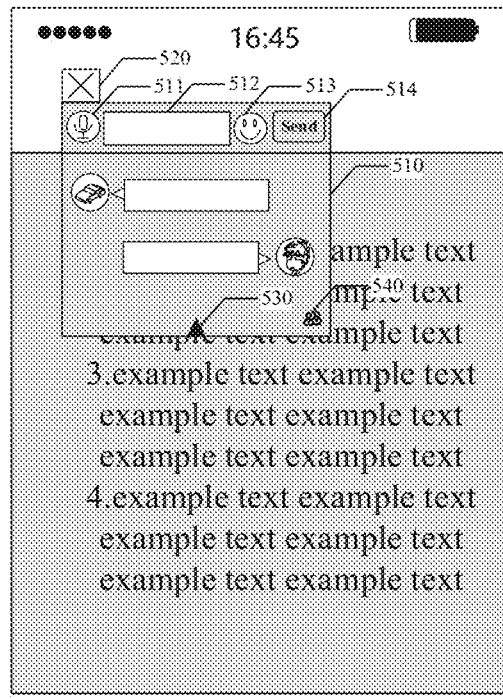
FIG. 5 is a schematic page diagram illustrating that a quick reply box is displayed in a second designated area of a graphical user interface according to an exemplary embodiment of the present disclosure.

Referring to FIG. 3 and FIG. 5, when the target user performs the third touch operation on the first operation control, in response to the third touch operation, the terminal device will hide the message notification bar 320, and at the same time, generate a quick reply box 510 on the upper layer of the initial content page 210. The quick reply box 510 may include, but is not limited to, a voice message recording control 511, an input box 512, an emoticon input control 513, a sending control 514, and so on. The target user can view the instant conversation messages sent by another user in the quick reply box, and quickly reply to the instant conversation message without leaving the initial content page 210. In this way, the user may directly reply to the instant conversation message without switching between the pages, which reduces resources such as traffic consumed when pages are switched and reloaded, and can also shorten the interactive path for the user to process messages.

Moreover, the user can change the display size of the quick reply box by performing a zoom operation on the quick reply box. For example, the zoom operation can be a zoom touch operation performed on the quick reply box by the user with two fingers. In addition, a size adjustment control may be added to the quick reply box, so that the user can enlarge or reduce the display size of the quick reply box through the size adjustment control.

According to another exemplary embodiment of the present disclosure, the quick reply box may include a second operation control. In response to a fourth touch operation on the second operation control, the quick reply box is removed. The second operation control may be an operation control provided to the target user for closing the quick reply box 510. The fourth touch operation may be a target users touch operation on the second operation control, and the fourth touch operation may include, but is not limited to, a click operation, a long press operation, a repress operation, and the like.

Referring to FIG. 5, the quick reply box 510 may include a second operation control 520. When the target user performs the fourth touch operation on the second operation control 520, the quick reply box 510 may be removed from the graphical user interface.

In addition, the quick reply box 510 may also include an operation guide mark 530. The target user can perform a touch operation based on the operation guide mark 530 to remove the quick reply box 510. The target user's touch operation based on the operation guide mark 530 may include but is not limited to the click operation, long press operation and repress operation on the operation guide mark 530. In addition, the target user's touch operation based on the operation guide mark 530 may also include the target user's swipe operation from the bottom of the quick reply box to the top of the quick reply box (i.e., the top of the screen).

Further, the target user can pre-configure a way of removing the quick reply box. For example, the way of removing the quick reply box can be configured as removing the quick reply box when a touch operation on the sending control 514 is detected. When the user touches the sending control 514, the user's quick reply operation is completed by default. The touch operation on the sending control 514 may include, but is not limited to, a click operation, a long press operation, and a repress operation on the sending control 514. In response to the target user's touch operation on the sending control 514, the quick reply box may be removed. The target user can configure the removal way of the quick reply box according to their usage habits, making the removal of the quick reply box more convenient and diversified, and improving the user experience.

Furthermore, the quick reply box 510 may also include an operation control 540 for jumping to the target conversation page. Referring to FIG. 4 and FIG. 5, the page shown in FIG. 5 may be switched to the target conversation page 410 in FIG. 4 and display the target conversation page 410, so that the user can perform other interactive operations through the target conversation page 410.

According to another exemplary embodiment of the present disclosure, it is detected whether the display duration of the floating window control exceeds a preset duration; if so, the floating window control is switched to a linear control, and the linear control is displayed on the edge of the target conversation page. The linear control is a presentation control in the abbreviative form of the floating window control. The display duration of the floating window control may be the length of time during which the floating window control is displayed on the page after the floating window control is generated. The preset duration may be a preset duration that is compared with the display duration of the floating window control. For example, the preset duration may be configured as 30 seconds, 60 seconds, 2 minutes, and so on. The linear control can be a page control with the same function as the floating window control. The corresponding page can be opened by touching the linear control, but the presentation style of the linear control is different from that of the floating window control. In other words, the linear control is an abbreviated presentation style control corresponds to the floating window control. The linear control, when being displayed, may be accompanied with a specific display effect. For example, the display effect of the linear control may include, but is not limited to, display effects such as light emission, shadow, mapping, and bevel.

Figure 6:
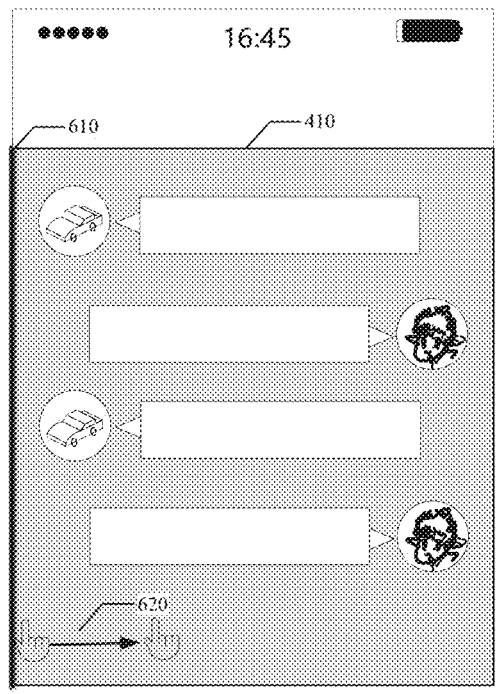
FIG. 6 is a schematic page diagram in which a floating window control is switched and displayed as a linear control according to an exemplary embodiment of the present disclosure.

Referring to FIG. 6, if it is detected that the display duration of the floating window control exceeds the preset duration, it can be considered that the target user will not perform touch operations on the floating window control temporarily. Therefore, the floating window control can be switched and displayed as a linear control 610. The linear control 610 is displayed on the page edge of the target conversation page 410. For example, it can be displayed on the page edge on the left side or the right side of the page as shown in FIG. 6, so as to prevent the floating window control from covering the page when it is displayed, and improve the user experience.

It is easy for those ordinary skilled in the art to understand that the preset duration can be configured according to the user's requirements in other exemplary embodiments of the present disclosure, so as to achieve the effect of facilitating the user's interactive operations. This is not particularly limited in the exemplary embodiments.

According to another exemplary embodiment of the present disclosure, after the linear control is displayed on the page edge of the target conversation page, the target conversation page is switched and displayed as the initial content page in response to a fifth touch operation on the linear control. The fifth touch operation can be a touch operation on the linear control when the linear control is displayed on the page. The fifth touch operation can include, but is not limited to, the target user's click operation, long press operation, and repress operation on the linear control etc., and the target user's designated swipe operation for the linear control in the current page. Specifically, the target user's designated swipe operation on the linear control may include an operation of swiping the linear control from left to right or swiping the linear control from right to left in the currently displayed page etc.

Referring to FIG. 2 and FIG. 6, when the linear control is displayed on the page edge on the left side of the target conversation page 410, the target conversation page 410 shown in FIG. 6 is switched and displayed as the initial content page 210 shown in FIG. 2 if a left-to-right swipe operation, as indicated by the arrow 620, of the target user on the linear control is detected. Similarly, when the linear control is displayed on the page edge on the right side of the target conversation page 410, the target conversation page is switched and displayed as the initial content page if a right-to-left swipe operation of the target user on the linear control is detected.

In some exemplary embodiments of the present disclosure, in response to the user performing the fifth touch operation on the linear control and the target conversation page being switched and displayed as the initial content page, the linear control can be automatically removed from the graphical user interface. That is, there is no need for the user to manually remove the linear control, reducing the user's operation steps.

In another exemplary embodiment of the present disclosure, in response to the user performing the fifth touch operation on the linear control and the target conversation page being switched and displayed as the initial content page, the linear control may be switched as a floating window control and displayed in the graphical user interface. Moreover, the page information corresponding to the floating window control is configured as the page information of the target conversation page, so that the target user can switch from the initial content page to the target conversation page through the floating window control again.

It should be noted that, as for whether the linear control is removed from the user graphical interface or switched to be displayed as the floating window control on the graphical user interface, the user can set in the system configuration of the application, which is not specially limited in the present disclosure.

Figure 7:
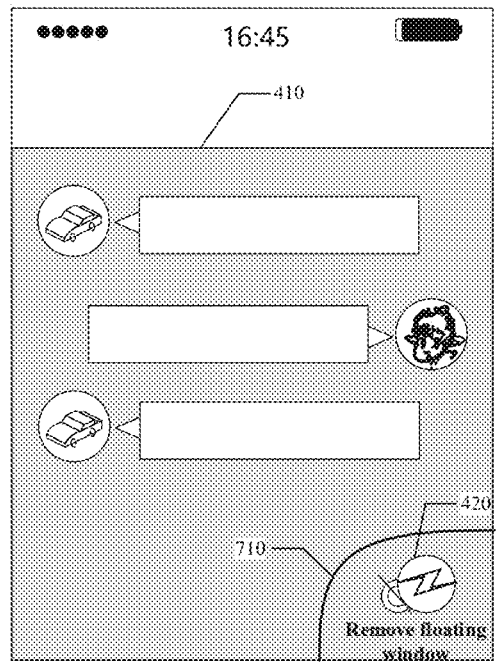
FIG. 7 is a schematic page diagram illustrating an operation of removing a floating window control according to an exemplary embodiment of the present disclosure.

According to yet another exemplary embodiment of the present disclosure, in response to a sixth touch operation on the floating window control, a floating window removal instruction for the floating window control is obtained, and the floating window control is removed according to the floating window removal instruction. The sixth touch operation may be a touch operation performed on the floating window control by the target user, and the sixth touch operation may be a swipe operation performed on the floating window control, for example, it may be an operation of dragging the floating window control to a designated area. Referring to FIG. 7, a designated area 710 can be a target area where the removal of the floating window control is triggered. The floating window control 420 can be removed from the current page by dragging it into the designated area 710, so that the floating window control is quickly removed when the target user does not need to use the floating window control. In this way, the operation steps for removing the floating window control used by the user can be simplified and the user experience is improved.

It should be noted that the terms "first", "second", "third", "fourth", "fifth", "sixth", etc. used in the present disclosure are only to distinguish different touch operations on different page objects, different operation controls, different designated areas, etc., and should not cause any limitation to the present disclosure.

In the embodiments of the present disclosure, in one aspect, if a target user receives a target conversation message sent from another user when browsing an initial content page, a message notification is displayed through a message notification bar, so that the user can preview received instant conversation message through the message notification bar. If the user performs the first touch operation on the message notification bar, the initial content page can be switched and displayed as a target conversation page, so that the user can enter the target conversation page through one step of touch operation to reply to the target conversation message while browsing the current page. In another aspect, a floating window control is automatically generated in a first designated area of the graphical user interface, and the user can quickly open the initial content page through the floating window control without searching for the initial content page again. Therefore, the user does not need to load a conversation message list, which reduces the user's operating steps and improves the user's operating efficiency. In yet another aspect, the user can perform a touch operation on the first operation control to trigger the generation of a quick reply box, so that the user can quickly reply to the conversation message based on the quick reply box, without switching back and forth between different pages, which can reduce the amount of resources consumed by loading the pages. In yet another aspect, the user can configure a display duration of the floating window control. When the display duration of the floating window control exceeds a preset duration, the floating window control will switch a display state thereof, so that the user can focus more on processing the conversation message, and the user can remove the floating window control from the page according to requirements, which improves the user's experience.

Figure 8:
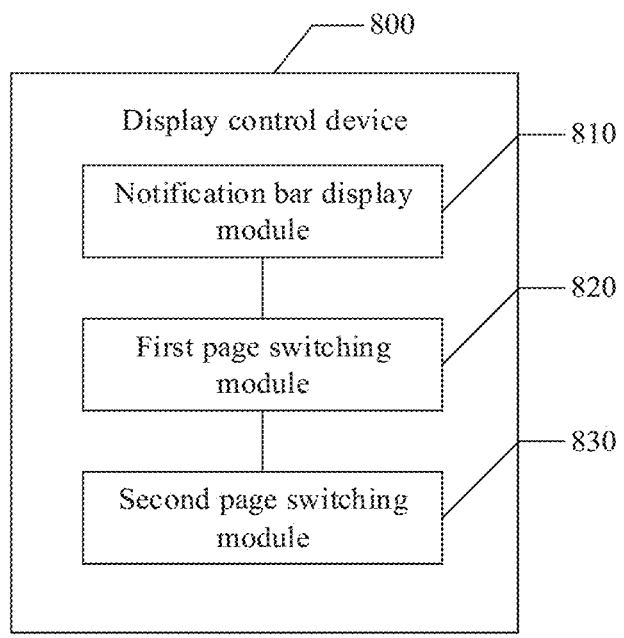
FIG. 8 is a first block diagram schematically illustrating a display control device according to an exemplary embodiment of the present disclosure.

Furthermore, a display control device is also provided in exemplary embodiments. Referring to FIG. 8, the display control device 800 may include a notification bar display module 810, a first page switching module 820, and a second page switching module 830.

In particular, the notification bar display module 810 may be configured to display a message notification bar corresponding to a target conversation message in a first designated area of a graphical user interface in response to an instruction of receiving the target conversation message. The first page switching module 820 may be configured to: in response to a first touch operation on the message notification bar, switch and display content displayed in a page display area from an initial content page to a target conversation page, and generate a floating window control in the graphical user interface. The target conversation page is a conversation page corresponding to the target conversation message. The second page switching module 830 may be configured to: in response to a second touch operation on the floating window control, switch and display the content displayed in the page display area from the target conversation page to the initial content page.

When the user browses a resource page, the display control device 800 can display a message notification bar to the user in the first designated area of the graphical user interface. The instant conversation message sent by another user is displayed in the message notification bar, and the user can preview the received instant conversation message through the message notification bar. If the user's first touch operation on the message notification bar is received, the initial content page can be switched and displayed as the target conversation page, so that the user can reply to the conversation message. Meanwhile, the floating window control is generated, so that the user can quickly open the initial content page through the floating window control, without searching the initial content page again, which can reduce the user's operation steps and improve the user's operation efficiency. It is an effective display control device.

Figure 9:
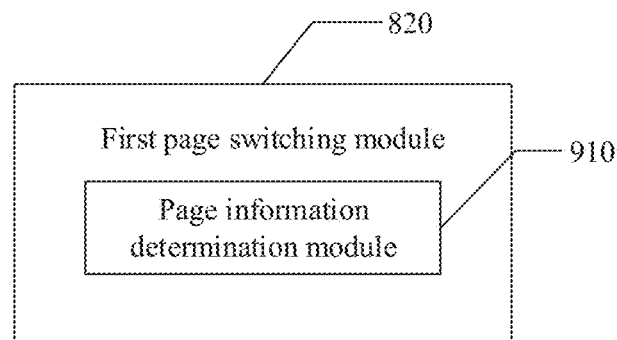
FIG. 9 is a first block diagram schematically illustrating a first page switching module according to an exemplary embodiment of the present disclosure.

According to some exemplary embodiments of the present disclosure, referring to FIG. 9, the first page switching module 820 may include a page information determining unit 910.

In particular, the page information determining unit 910 may be configured to determine page information of the initial content page and associate the page information with the floating window control. The page information includes: a page address of the initial content page, a page identifier of the initial content page, and a page position when the initial content page is closed.

The page information determining unit 910 can obtain the page information of the page currently browsed by the user (that is, the initial content page), and associate the obtained page information with the floating window control, so that the user can open the initial content page again through the floating window control. Moreover, the user can continue to browse the initial content page from the page position being browsed when the initial content page was closed last time, which reduces the user's manual operation for searching the initial content page and page browsing position.

Figure 10:
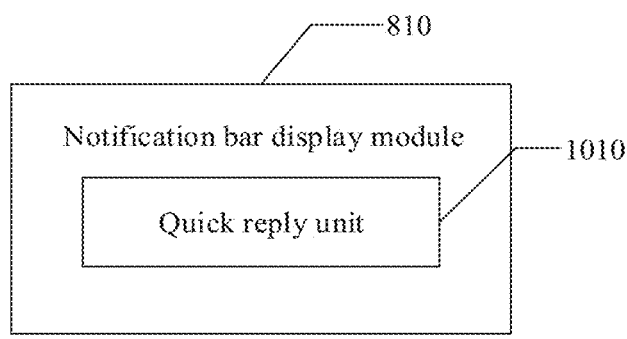
FIG. 10 is a block diagram schematically illustrating a notification bar display module according to an exemplary embodiment of the present disclosure.

According to some exemplary embodiments of the present disclosure, referring to FIG. 10, the notification bar display module 810 may include a quick reply unit 1010.

In particular, the quick reply unit 1010 can be configured to: in response to a third touch operation on the first operation control, hide the message notification bar, and generate a quick reply box with a preset size is in a second designated area of the graphical user interface, so as to reply to the target conversation message based on the quick reply box.

The quick reply unit 1010 can respond to the user's touch operation on the first operation control and generate a quick reply box. The user can quickly reply to the target conversation message through the quick reply box, and does not need to exit the currently browsed page, so that the user's reply operation is faster.

Figure 11:
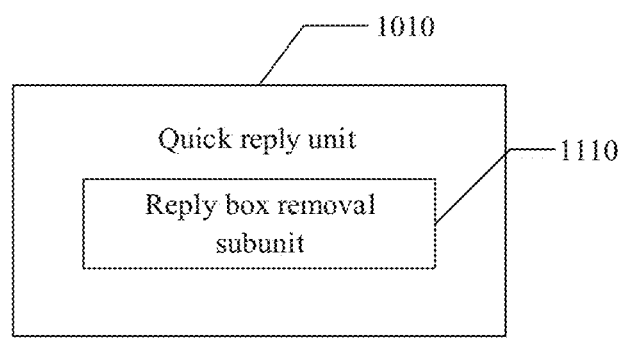
FIG. 11 is a block diagram schematically illustrating a quick reply unit according to an exemplary embodiment of the present disclosure.

According to another exemplary embodiment of the present disclosure, referring to FIG. 11, the quick reply unit 1010 may include a reply box removal subunit 1110.

The reply box removal subunit 1110 may be further configured to remove the quick reply box in response to a fourth touch operation on the second operation control.

The reply box removal subunit 1110 can be configured to perform a corresponding touch operation on the quick reply box after the user completes the quick reply to the target conversation message, so as to remove the quick reply box displayed on the current page, and continue browsing the current page.

Figure 12:
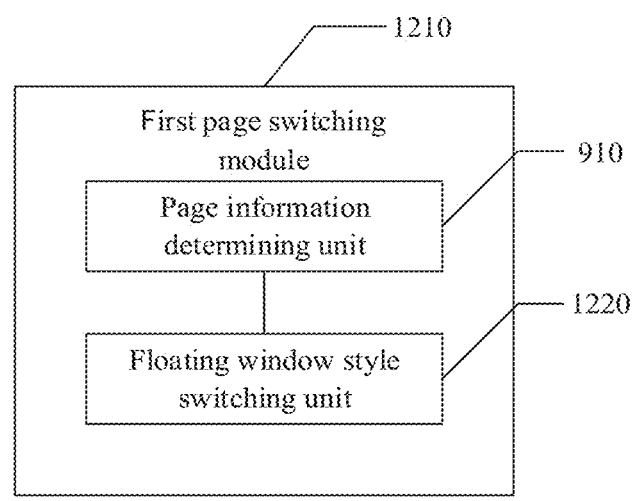
FIG. 12 is a second block diagram schematically illustrating a first page switching module according to an exemplary embodiment of the present disclosure.

According to another exemplary embodiment of the present disclosure, referring to FIG. 12, compared with the first page switching module 820, the first page switching module 1210 may include a floating window style switching unit 1220 in addition to the page information determining unit 910.

In particular, the floating window style switching unit 1220 can be configured to detect whether a display duration of the floating window control exceeds a preset duration; if so, the floating window control is switched to a linear control, and the linear control is displayed on the page edge of the target conversation page. The linear control is a presentation control in abbreviative form corresponding to the floating window control.

The floating window style switching unit 1220 can switch and display the floating window control as a linear control when the display duration of the floating window control exceeds the preset duration, and display the linear control on the page edge of the target conversation page, so as to prevent the floating window control from covering the target conversation page.

Figure 13:
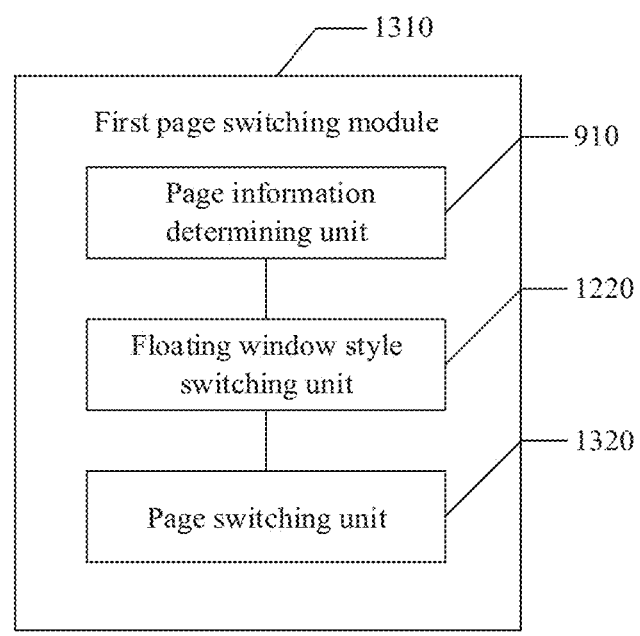
FIG. 13 is a third block diagram schematically illustrating a first page switching module according to an exemplary embodiment of the present disclosure.

According to yet another exemplary embodiment of the present disclosure, referring to FIG. 13, compared with the first page switching module 1210, the first page switching module 1310 may include a page switching unit 1320 in addition to the page information determining unit 910 and the floating window style switching unit 1220.

In particular, the page switching unit 1320 can be configured to, after the linear control is displayed on the page edge of the target conversation page, switch and display the target conversation page as the initial content page in response to a fifth touch operation on the linear control.

The page switching unit 1320 can perform a corresponding touch operation on the linear control when the linear control is displayed on the upper layer of the target conversation page, and switch and display the target conversation page as the initial content page, so that the user can continue to browse the initial content page that was closed last time. At the same time, the linear control can be removed or switched to display as a floating window control.

Figure 14:
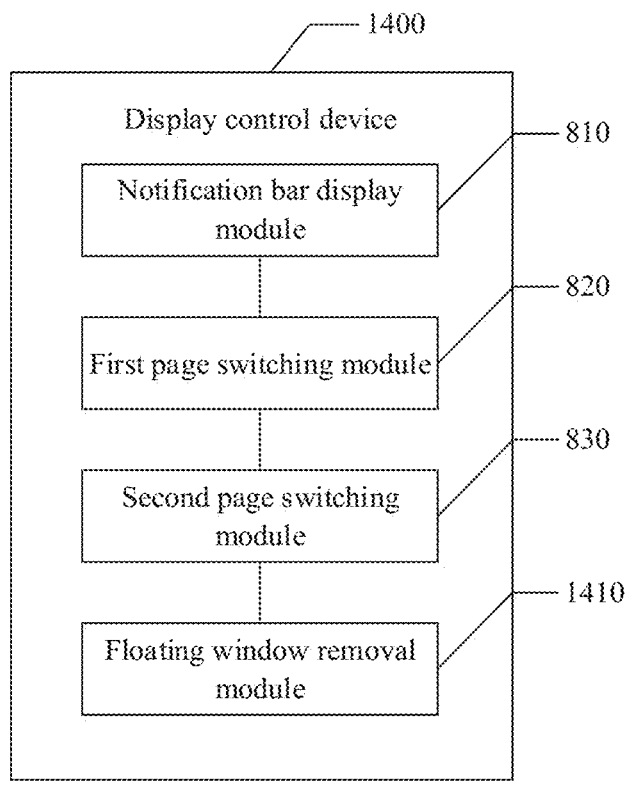
FIG. 14 is a second block diagram schematically illustrating a display control device according to an exemplary embodiment of the present disclosure.

In yet another exemplary embodiment of the present disclosure, referring to FIG. 14, compared with the display control device 800, the display control device 1400 may further include a floating window removal module 1410 in addition to the notification bar display module 810, the first page switching module 820, and the second page switching module 830.

In particular, the floating window removal module 1410 may be configured to: obtain a floating window removal instruction for the floating window control in response to a sixth touch operation on the floating window control; and remove the floating window control according to the floating window removal instruction.

The floating window removal module 1410 can respond to the user's touch operation on the floating window control, obtain a floating window removal instruction for removing the floating window control according to the touch operation, and remove the floating window control based on the floating window removal instruction.

The specific details of each virtual module of the display control device mentioned above have been described in detail in the corresponding display control method, and therefore will not be repeated here.

It should be noted that although several modules or units of a virtual object processing apparatus are mentioned in the above detailed description, such division is not mandatory. In fact, according to the embodiments of the present disclosure, the features and functions of two or more modules or units described above may be embodied in one module or unit. Conversely, the features and functions of a module or unit described above can be further divided into multiple modules or units to be embodied.

Further, in an exemplary embodiment of the present disclosure, an electronic apparatus capable of implementing the above method is also provided.

Those ordinary skilled in the art can understand that various aspects of the present disclosure can be implemented as a system, a method, or a program product. Therefore, various aspects of the present disclosure can be specifically implemented in the following forms, that is, a complete hardware embodiment, a complete software embodiment (including firmware, microcode, etc.), or a combination of hardware and software embodiments, which may be collectively referred to herein as "circuit", "module" or "system".

An electronic apparatus 1500 according to an embodiment of the present disclosure will be described below with reference to FIG. 15. The electronic apparatus 1500 shown in FIG. 15 is only an example, and should not bring any limitation to the function and application scope of the embodiment of the present disclosure.

Figure 15:
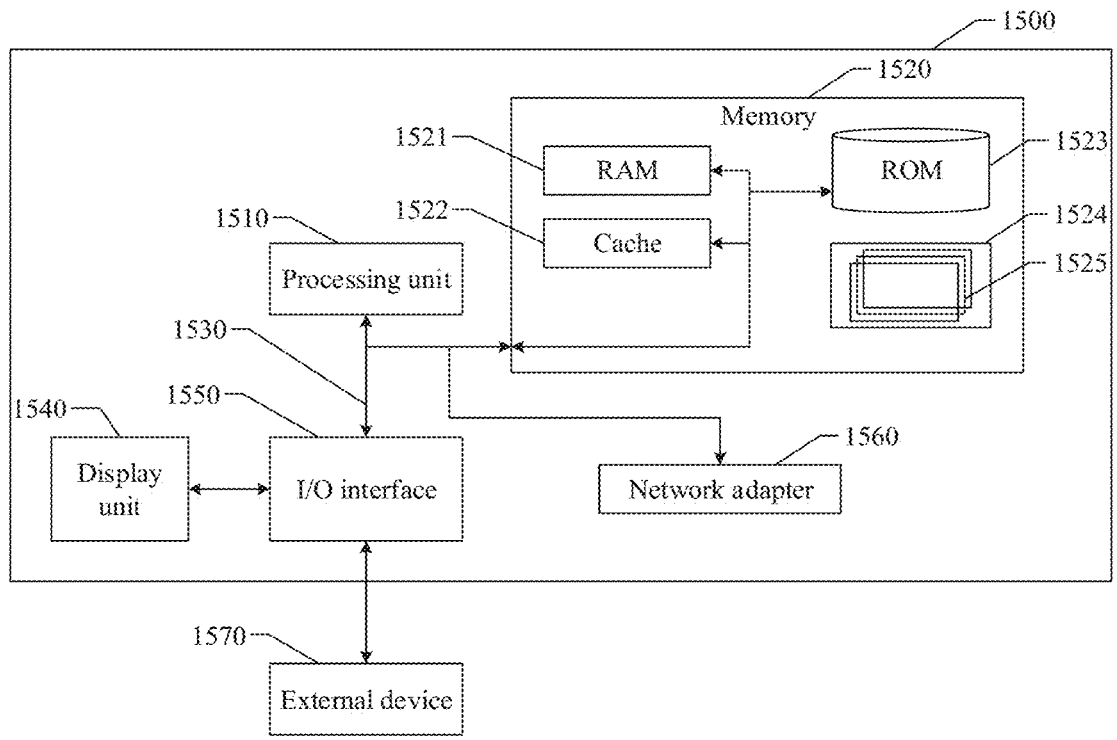
FIG. 15 is a block diagram schematically illustrating an electronic apparatus according to an exemplary embodiment of the present disclosure.

As shown in FIG. 15, the electronic apparatus 1500 is represented in a form of a general-purpose computing device. The components of the electronic apparatus 1500 may include, but are not limited to: the aforementioned at least one processing unit 1510, the aforementioned at least one memory 1520, a bus 1530 connecting different system components (including the memory 1520 and the processing unit 1510), and a display unit 1540.

The memory stores program codes that, when executed by the processing unit 1510, cause the processing unit 1510 to execute steps of various exemplary embodiments described in the "exemplary method" section of this specification.

The memory 1520 may include a volatile readable medium, such as a random access memory (RAM) 1521 and/or a cache memory 1522, and may further include a read-only memory (ROM) 1523.

The memory 1520 may further include a program/utility 1524 having a set of (at least one) program module 1525. Such program module 1525 includes, but is not limited to: an operating system, one or more applications, other program modules, and program data. Each of these examples or some combination thereof may include the implementation of a network environment.

The bus 1530 may represent one or more of several types of bus structures, including a memory bus or a memory controller, a peripheral bus, a graphics acceleration port, a processing unit, or a local bus using any of a variety of bus structures.

The electronic apparatus 1500 can also communicate with one or more external devices 1570 (such as keyboards, pointing devices, Bluetooth devices, etc.), and can also communicate with one or more devices that enable a user to interact with the electronic apparatus 1500, and/or communicate with any device (eg, a router, a modem, etc.) that enables the electronic apparatus 1500 to communicate with one or more other computing devices. Such communication can be performed through an input/output (I/O) interface 1550. In addition, the electronic apparatus 1500 may also communicate with one or more networks (for example, a local area network (LAN), a wide area network (WAN), and/or a public network, such as the Internet) through a network adapter 1560. As shown in the figure, the network adapter 1560 communicates with other modules of the electronic apparatus 1500 through the bus 1530. It should be understood that although not shown in the figure, other hardware and/or software modules can be used in conjunction with the electronic apparatus 1500, including but not limited to: microcode, a device driver, a redundant processing unit, an external disk drive array, a RAID system, a tape drive and a data backup storage system, etc.

Through the description of the above embodiments, those ordinary skilled in the art can easily understand that the exemplary embodiments described here can be implemented by software, or can be implemented by combining software with necessary hardware. Therefore, the technical solution according to the embodiments of the present disclosure can be embodied in the form of a software product, and the software product can be stored in a non-volatile storage medium (which can be a CD-ROM, U disk, mobile hard disk, etc.) or on the network, including several instructions to make a computing device (which can be a personal computer, a server, a terminal device, or a network device, etc.) execute the method according to the embodiments of the present disclosure.

In the exemplary embodiments of the present disclosure, there is also provided a computer-readable storage medium on which is stored with a program product capable of implementing the above-mentioned method in this specification. In some possible embodiments, various aspects of the present disclosure may also be implemented in the form of a program product, which includes program code. When the program product runs on a terminal device, the program code is used to enable the terminal device to execute the steps according to various exemplary embodiments of the present disclosure described in the above-mentioned "exemplary method" section of this specification.

Figure 16:
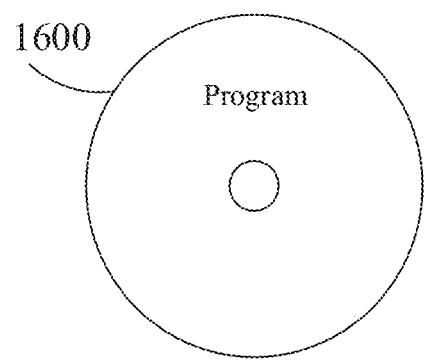
FIG. 16 is a schematic diagram schematically illustrating a computer-readable storage medium according to an exemplary embodiment of the present disclosure.

Referring to FIG. 16, a program product 1600 for implementing the above method according to an embodiment of the present invention is described. The program product 1600 can adopt a portable compact disk read-only memory (CD-ROM) and include program code, and can be installed in a terminal device, for example, running on a personal computer. However, the program product of the present disclosure is not limited to this. In this document, the readable storage medium can be any tangible medium that contains or stores a program, and the program can be used by or combined with an instruction execution system, a device, or a component.

The program product can use any combination of one or more readable media. The readable medium may be a readable signal medium or a readable storage medium. The readable storage medium may be, for example, but not limited to, an electrical, magnetic, optical, electromagnetic, infrared, or semiconductor system, device, or component, or a combination of any of the above. More specific examples (non-exhaustive list) of the readable storage media include: storage media with electrical connections through one or more wires, portable disks, hard disks, random access memory (RAM), read-only memory (ROM), electrically programmable read only memory (EPROM or flash memory), optical fiber, portable compact disk read only memory (CD-ROM), optical storage device, magnetic storage device, or any suitable combination of the above.

The computer-readable signal medium may include a data signal propagated in the baseband or as a part of a carrier wave, and readable program code is carried therein. This propagated data signal can take many forms, including but not limited to electromagnetic signals, optical signals, or any suitable combination of the foregoing. The readable signal medium may also be any readable medium other than a readable storage medium, and the readable medium may send, propagate, or transmit a program for use by or in combination with the instruction execution system, apparatus, or device.

The program code contained on the readable medium can be transmitted by any suitable medium, including but not limited to wireless, wired, optical cable, RF, etc., or any suitable combination of the foregoing.

The program code used to perform the operations of the present disclosure can be written in any combination of one or more programming languages. The programming languages include object-oriented programming languages such as Java, C++, etc., as well as conventional procedural programming languages such as "C" language or similar programming language. The program code can be executed entirely on the user's computing device, partly on the user's device, executed as an independent software package, partly on the user's computing device and partly executed on the remote computing device, or entirely on the remote computing device or server. In the case of a remote computing device, the remote computing device can be connected to a user computing device through any kind of network, including a local area network (LAN) or a wide area network (WAN), or it can be connected to an external computing device (for example, via the Internet by Internet service providers).

In addition, the above-mentioned drawings are merely schematic illustrations of the processing included in the method according to the exemplary embodiment of the present disclosure, and are not intended for limitation. It is easy to understand that the processing shown in the above drawings does not indicate or limit the time sequence of such processing. In addition, for example, it is easy to understand that these processes can be executed synchronously or asynchronously in multiple modules.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are exemplary, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is merely defined by the appended claims.

What is claimed is:

1. A display control method of a mobile terminal, wherein a graphical user interface which comprises a page display area is displayed on a screen of the mobile terminal, the method comprising:
    in response to an instruction of receiving a target conversation message, displaying a message notification bar corresponding to the target conversation message in a first designated area of the graphical user interface;
    in response to a first touch operation on the message notification bar, switching and displaying display content in the page display area from an initial content page to a target conversation page, and generating a floating window control in the graphical user interface, wherein the target conversation page is a conversation page corresponding to the target conversation message; and
    in response to a second touch operation on the floating window control, switching and displaying the display content in the page display area from the target conversation page to the initial content page.

2. The display control method according to claim 1, wherein before generating a floating window control in the graphical user interface, the method further comprises:
    determining page information of the initial content page, and associating the page information with the floating window control;
    wherein the page information comprises: a page address of the initial content page, a page identifier of the initial content page, and a page position when the initial content page is closed.

3. The display control method according to claim 1, wherein the message notification bar comprises a first operation control, the method further comprising:
    in response to a third touch operation on the first operation control, hiding the message notification bar, and generating a quick reply box with a preset size in a second designated area of the graphical user interface, in order to reply to the target conversation message based on the quick reply box.

4. The display control method according to claim 3, wherein the quick reply box comprises a second operation control, the method further comprising:
    in response to a fourth touch operation on the second operation control, removing the quick reply box.

5. The display control method according to claim 1, wherein before, in response to a second touch operation on the floating window control, switching and displaying the display content in the page display area from the target conversation page to the initial content page, the method further comprises:
    detecting whether a display duration of the floating window control exceeds a preset duration;
    if the display duration of the floating window control exceeds the preset duration, switching the floating window control to a linear control, and displaying the linear control on a page edge of the target conversation page;
    wherein the linear control is a presentation control in an abbreviative form corresponding to the floating window control.

6. The display control method according to claim 5, wherein after displaying the linear control on a page edge of the target conversation page, the method further comprises:

in response to a fifth touch operation on the linear control, switching from the target conversation page to the initial content page and displaying the display content of the initial content page.

7. The display control method according to claim 1, further comprising:
in response to a sixth touch operation on the floating window control, obtaining a floating window removal instruction for the floating window control; and
removing the floating window control according to the floating window removal instruction.

8. The display control method according to claim 1, wherein switching and displaying the display content in the page display area from the target conversation page to the initial content page in response to the second touch operation on the floating window control comprises:
removing the floating window control from the graphical user interface automatically, wherein the initial content page and the target conversation page are different pages that belong to a same application.

9. A display control device, comprising a processor and a memory, wherein the memory is configured to store a computer program that, when executed by the processor, causes the processor to:
in response to an instruction of receiving a target conversation message, display a message notification bar corresponding to the target conversation message in a first designated area of a graphical user interface;
in response to a first touch operation on the message notification bar, switch and display the display content in a page display area from an initial content page to a target conversation page; and generate a floating window control in the graphical user interface, wherein the target conversation page is a conversation page corresponding to the target conversation message; and
in response to a second touch operation on the floating window control, switch and display the display content in the page display area from the target conversation page to the initial content page.

10. The display control device according to claim 9, wherein the processor is further configured to:
determine page information of the initial content page, and associate the page information with the floating window control;
wherein the page information comprises: a page address of the initial content page, a page identifier of the initial content page, and a page position when the initial content page is closed.

11. The display control device according to claim 9, wherein the message notification bar comprises a first operation control, and the processor is further configured to:
in response to a third touch operation on the first operation control, hide the message notification bar, and generate a quick reply box with a preset size in a second designated area of the graphical user interface, to reply to the target conversation message based on the quick reply box.

12. The display control device according to claim 11, wherein the quick reply box comprises a second operation control, and the processor is further configured to:
in response to a fourth touch operation on the second operation control, remove the quick reply box.

13. The display control device according to claim 9, wherein the processor is further configured to:
detect whether a display duration of the floating window control exceeds a preset duration;
if the display duration of the floating window control exceeds the preset duration, switch the floating window control to a linear control, and display the linear control on a page edge of the target conversation page;
wherein the linear control is a presentation control in an abbreviative form corresponding to the floating window control.

14. The display control device according to claim 13, wherein the processor is further configured to:
in response to a fifth touch operation on the linear control, switch the target conversation page to the initial content page and display the initial content page.

15. The display control device according to claim 9, wherein the processor is further configured to:
in response to a sixth touch operation on the floating window control, obtain a floating window removal instruction for the floating window control; and
remove the floating window control according to the floating window removal instruction.

16. The display control device according to claim 9, wherein the processor is further configured to:
remove the floating window control from the graphical user interface automatically while switching and displaying the display content in the page display area from the target conversation page to the initial content page in response to the second touch operation on the floating window control, wherein the initial content page and the target conversation page are different pages that belong to a same application.

17. A non-transitory computer-readable storage medium storing a computer program that, when executed by a processor, causes the processor to perform the following operations:
in response to an instruction of receiving a target conversation message, displaying a message notification bar corresponding to the target conversation message in a first designated area of a graphical user interface;
in response to a first touch operation on the message notification bar, switching and displaying display content in a page display area from an initial content page to a target conversation page, and generating a floating window control in the graphical user interface, wherein the target conversation page is a conversation page corresponding to the target conversation message; and
in response to a second touch operation on the floating window control, switching and displaying the display content in the page display area from the target conversation page to the initial content page.

18. The non-transitory computer-readable storage medium according to claim 17, wherein before generating a floating window control in the graphical user interface, the processor is further configured to perform the following operations:
determining page information of the initial content page, and associating the page information with the floating window control;
wherein the page information comprises: a page address of the initial content page, a page identifier of the initial content page, and a page position when the initial content page is closed.

19. The non-transitory computer-readable storage medium according to claim 17, wherein the message notification bar comprises a first operation control, the processor is further configured to perform the following operations:
in response to a third touch operation on the first operation control, hiding the message notification bar, and generating a quick reply box with a preset size in a second designated area of the graphical user interface, to reply to the target conversation message based on the quick reply box.

20. The non-transitory computer-readable storage medium according to claim 17, wherein the processor is further configured to:
  remove the floating window control from the graphical user interface automatically while switching and displaying the display content in the page display area from the target conversation page to the initial content page in response to the second touch operation on the floating window control, wherein the initial content page and the target conversation page are different pages that belong to a same application.

* * * * *